Patented Sept. 12, 1933

1,926,498

UNITED STATES PATENT OFFICE 1,926,498

PROCESS FOR THE PREPARATION OF EFFECT THREADS

Alfred Rheiner, Basel, Switzerland, assignor to the firm "Chemical Works Formerly Sandoz", Basel, Switzerland No Drawing. Application February 21, 1929, Serial No. 341,850, and in Great Britain March 2, 1928

2 Claims. (Cl. 8—20)

This invention relates to an improvement in the manufacture described in the U. S. Patent No. 1,861,320, dated May 31, 1932. According to the said specification, effect threads are manufactured by acetylation of vegetable fibres with a mixture of acetic anhydride, acetic acid and a catalyst, by allowing the acetylation to progress only until the cellulose mono- and diacetate is formed, whilst however using catalysts which hitherto have been employed for the preparation of cellulose triacetate.

According to the present invention, lustrous treads are obtained by subjecting cotton which has been mercerized either by an alkaline or acid treatment to the process of the said specification. The fibre thus produced shows the original structure of the cotton employed having a beautiful lustre and being undyeable by direct dyestuffs.

The completion of the acetylation is exactly the same as described in said U. S. Patent No. 1,861,320, but the reaction on mercerized cotton does not begin sufficiently quickly for practical purposes at ordinary temperature with the acetylation mixture as indicated in said specification. The acetylation, however, can be carried out in an appropriate time, when the temperature is raised, for instance, above 40° C. In this case, the reaction begins promptly and is finished in a much shorter time than is the case when esterifying ordinary cotton.

Instead of submitting mercerized cotton in a previously prepared acetylating mixture as indicated in said Patent No. 1,861,320, the acetylation may also be carried out as follows:

The mercerized vegetable fibre can first be treated in a bath with one or two of the constituents of the acetylation mixture and then the remaining constituents can be gradually added.

All the possible combinations and permutations can be used, thus the mercerized cotton fibres can be placed in glacial acetic acid and the acetic anhydride and the catalyzers added later, or the cellulose materials can first be impregnated with acetic anhydride and glacial acetic acid and the catalyzer gradually added, or the material can be impregnated with the catalyzer and introduced into a bath containing the mixture of acetic anhydride and glacial acetic acid. Still another variation consists in introducing the cellulose material into a mixture of acetic anhydride and glacial acetic acid and then gradually adding the catalyst, or the cellulose material can be introduced into a mixture of glacial acetic acid or acetic anhydride and the catalyzer and the acetic anhydride or glacial acetic acid respectively added. Each of these methods of carrying out the reaction may give goods results when suitably varying the other conditions of the reaction. The acetic anhydride may be present in unlimited quantity or only the theoretical quantity thereof may be present.

In carrying out the process technically it is of importance with large charges to keep the acetylation mixture in movement to facilitate uniform action.

The working conditions of the improved process may be varied to a large extent; for instance, if it is desired to have the acetylation finished in a short time, I can either employ larger quantities of catalyzer or I can work at a higher temperature. When the reaction is carried out at higher temperatures, either the same is finished in a shorter time or smaller quantities of catalyzer are necessary. When greater quantities of catalyzer are used, either the reaction proceeds more rapidly or at lower temperatures. Small quantities of catalyzer either require higher temperatures or a longer duration of reaction.

The invention is further illustrated but not limited by the following examples:

Example 1

100 gms. of mercerized yarn are introduced into an acetylating mixture consisting of 20 gms. of zinc chloride, 100 gms. of acetic anhydride and 880 gms. of glacial acetic acid and left in the above solution at 60° C. until they are, after washing and drying, completely resistant to substantive dyes, which is the case in about 6–7 hours. The fibres thus prepared consist of cellulose monoacetate. The yarn is then hydro-extracted, washed and dried.

The yarn treated according to this method is no longer dyed by a direct dyestuff.

Example 2

100 gms. of mercerized cotton are introduced into 800 gms. of glacial acetic acid (99%) and after some time a mixture consisting of 50 gms. of zinc chloride and of 250 gms. of acetic anhydride is added. After the formation of the cellulose monoacetate the yarn is treated in the manner described in Example 1.

The quantities given in the above examples are not to be regarded as fixed ones as the same results can be obtained by other conditions.

What I claim is:

1. A process for the preparation of lustrous effect threads, having no affinity for substantive dyestuffs and consisting of the lower acetylated derivatives of cellulose, by the direct acetylation of mercerized cellulosic fibres without altering the physical characteristics of such fibres, the reaction being effected in a single acetylating bath, said process comprising immersing natural cellulosic fibres in a quantity of acetylating mixture containing an amount of acetic anhydride in excess of that theoretically required to form the said derivatives, said mixture consisting of acetic anhydride, glacial acetic acid and an acetylating catalyst, the fibres being entirely covered by and in contact with excess of acetylating mixture throughout the course of the reaction, allowing the acetylating mixture to react on the fibres only until the mono- and diacetyl derivatives of cellulose have been formed, care being taken that during the reaction no local superheating occurs and that the temperature of the mass is uniform, and thereupon separating the resulting effect threads from the acetylating mixture.

2. A process for the preparation of lustrous effect threads, having no affinity for substantive dyestuffs and consisting of the lower acetylated derivatives of cellulose, by the direct acetylation of mercerized cellulosic fibres without altering the physical characteristics of such fibres, the reaction being effected in a single acetylating bath, said process comprising immersing natural cellulosic fibres in a quantity of acetylating mixture containing an amount of acetic anhydride in excess of that theoretically required to form the said derivatives, said mixture consisting of acetic anhydride, glacial acetic acid and an acetylating catalyst, the fibres being entirely covered by and in contact with excess of acetylating mixture throughout the course of the reaction, allowing the acetylating mixture while keeping it in movement to react on the fibres only until the mono- and diacetyl derivatives of cellulose have been formed, care being taken that during the reaction no local superheating occurs and that the temperature of the mass is uniform, and thereupon separating the resulting effect threads from the acetylating mixture.

ALFRED RHEINER.